US012775453B1

(12) United States Patent

Hizmi et al.

(10) Patent No.: US 12,775,453 B1

(45) Date of Patent: Oct. 27, 2026

(54) SYSTEM AND METHOD OF GENERATING COMPRESSED REPRESENTATIONS OF INPUT DATA FOR ARTIFICIAL INTELLIGENCE AGENTS

(71) Applicant: Coretado, Inc., New York, NY (US)

(72) Inventors: Shmuel Hizmi, Tel Aviv (IL); Amitay Gilboa, Tel Aviv (IL)

(73) Assignee: Coretado, Inc., New York, NY (US)

(*) Notice: Subject to any disclaimer, the term of this patent is extended or adjusted under 35 U.S.C. 154(b) by 0 days.

(21) Appl. No.: 19/634,259

(22) Filed: Mar. 31, 2026

(51) Int. Cl.
*G06F 8/35* (2018.01)

(52) U.S. Cl.
CPC ...................................... *G06F 8/35* (2013.01)

(58) Field of Classification Search
CPC ......................................................... G06F 8/35
See application file for complete search history.

(56) References Cited

U.S. PATENT DOCUMENTS

| | | | | |
|---|---|---|---|---|
| 12,393,405 B1* | 8/2025 | Mandal | ............... | G06F 11/3684 |
| 2006/0009962 A1* | 1/2006 | Monk | ................... | G06F 40/151 704/4 |
| 2011/0219357 A1* | 9/2011 | Livshits | .................. | H03M 7/30 717/115 |
| 2025/0355653 A1* | 11/2025 | Dima | ...................... | G06F 8/427 |

OTHER PUBLICATIONS

Yuling Shi et al., "LongCodeZip: Compress Long Context for Code Language Models" Oct. 1, 2025 [retrieved May 26, 2026], pp. 1-13, downloaded from <url>:https://arxiv.org/abs/2510.00446. (Year: 2025).*

Haoxiang Jia et al., "Compressing Code Context for LLM-based Issue Resolution", Mar. 30, 2026 [retrieved May 26, 2026], pp. 1-12, downloaded from <url>:https://arxiv.org/abs/2603.28119. (Year: 2026).*

Zongwei Li et al., "DeepCode: Open Agentic Coding", Dec. 8, 2025 [retrieved May 26, 2026], pp. 1-23, downloaded from <url>:https://arxiv.org/ abs/2512.07921. (Year: 2025).*

Huiqiang Jiang et al."LLMLingua: Compressing Prompts for Accelerated Inference of Large Language Models", Microsoft Corporation {hjiang, qianhuiwu, cyl, yuqing.yang liliqiu}, arXiv:2310.05736v2, pp. 1-19, Dec. 6, 2023.

* cited by examiner

*Primary Examiner* — S. Sough

*Assistant Examiner* — Stephen D Berman

(74) *Attorney, Agent, or Firm* — PEARL COHEN LLP

(57) ABSTRACT

Systems and methods of compressing input source code for processing by a large language model with a limited context window, parsing input source code using the programming language's formal grammar to generate an Abstract Syntax Tree (AST), generating a semantic model by extracting from the AST structural relationships functional relationships, classifying each AST node into a semantic tier based on its element type, selecting AST nodes for retention by iteratively including nodes in descending importance order, enabling the large language model to request selective expansion, transmitting the compressed output with embedded reference records to the large language model, and upon receiving from the large language model a request to expand a specific region identified by AST node reference, retrieving the original source for that region, transmitting it.

19 Claims, 8 Drawing Sheets

| SCORE | TIER | SOURCE CODE |
|---|---|---|
| 20 | Static/JSX | `import { useState, useEffect } from "react";` |
| 15 | Static/JSX | `import { Dialog, DialogContent } from "@/ui";` |
| 25 | Static/JSX | `import { parseHtmlToBlocks } from "./utils";` |
| | | |
| 100 | Interface | `interface EmailDesignerProps {` |
| 100 | Interface | `open: boolean;` |
| 100 | Interface | `onOpenChange: (open: boolean) => void;` |
| 100 | Interface | `template?: {` |
| 100 | Interface | `itemId: string;` |
| 100 | Interface | `name: string;` |
| 100 | Interface | `} \| null;` |
| 100 | Interface | `onSave?: () => void;` |
| 100 | Interface | `}` |
| | | |
| 95 | Interface | `export function EmailDesigner({` |
| 95 | Interface | `open, onOpenChange, template, onSave` |
| 95 | Interface | `}: EmailDesignerProps) {` |
| 70 | State | `const [name, setName] = useState("");` |
| 70 | State | `const [subject, setSubject] = useState("");` |
| 75 | State | `const [blocks, setBlocks] = useState([]);` |
| 65 | State | `const [selectedId, setSelectedId] = useState(null);` |
| | | |
| 25 | Static/JSX | `const iconMap = {` |
| 15 | Static/JSX | `"heading": Heading,` |
| 15 | Static/JSX | `"paragraph": AlignLeft,` |
| 15 | Static/JSX | `"button": MousePointer,` |
| 15 | Static/JSX | `};` |

Fig. 5

SYSTEM AND METHOD OF GENERATING COMPRESSED REPRESENTATIONS OF INPUT DATA FOR ARTIFICIAL INTELLIGENCE AGENTS

FIELD OF THE INVENTION

The present invention relates to context management for artificial intelligence (AI) agents. More particularly, the present invention relates to systems and methods for generating compressed representations of input data for AI agents.

BACKGROUND OF THE INVENTION

AI systems, including language-model-based systems, are increasingly used to work on large datasets of text, or support software development activities such as code generation, refactoring, debugging, and code comprehension. In many practical deployments, such AI systems typically operate under constraints on the amount of information that can be provided to, or processed by, the AI system at a particular time. These constraints may arise from limits on input size, processing resources, latency requirements, and/or cost considerations. Thus, an architectural limitation can arise that can restrict the amount of information that can be processed in a single inference pass.

As AI agents become more common for everyday use, many users try to improve textual projects, for instance via improving software code. Modern software projects frequently include very large codebases spanning numerous files, modules, libraries, and/or services. When an AI agent reasons about such codebases, difficulties can include that the AI agent typically must acquire sufficient contextual understanding to complete complex tasks without exceeding resource limits or suffering performance degradation. Effective performance on non-trivial software engineering tasks generally requires understanding not only isolated code fragments, but also relationships among components, including interfaces, dependencies, call relationships, data flows, and/or architectural structure.

When only a portion of a text or codebase is available for consideration at a particular time, relevant context may be omitted, which can impair the quality, reliability, and/or correctness of the resulting analysis.

Common approaches for selecting information to provide to AI systems typically include retrieving code segments based on keyword matching, similarity search, and/or file-level selection.

Difficulties with the common approaches can include, information selected in this manner can omit structural relationships necessary for comprehension, can include irrelevant material that consumes limited input capacity, and can require repeated iterative queries to locate and/or assemble sufficient context. In addition, the amount of retrieved information can be difficult to predict in advance, leading to inconsistent performance, increased processing time, and/or increased operational cost.

Accordingly, there remains a need for improved techniques for enabling AI systems to, for example, operate effectively over large textual databases under practical constraints on available input capacity and/or processing resources.

SUMMARY OF THE INVENTION

There is thus provided, in accordance with some embodiments of the invention, a method of generating a compressed representation of source code for an artificial intelligence (AI) agent, the method including: receiving, by a processor, input source code and a size of a target context window associated with the AI agent, wherein the size of the target context window is based on a type of the AI agent, generating, by the processor, a semantic model of the input source code by: (i) parsing the input source code according to a grammatical structure of the input source code's programming language to produce a parse tree, (ii) extracting structural relationships between parsed elements of the parse tree, and (iii) extracting functional relationships between parsed elements of the parse tree, classifying, by the processor, each parsed element of the input source code based on element type of each parsed element as determined from the parse tree, and based on the position and connectivity within the semantic model, determining, by the processor, a semantic importance score for each parsed element based on element type classification and based on a degree of connectivity for each parsed element in the semantic model, wherein the degree of connectivity is based on the extracted structural relationships and the extracted functional relationships, generating, by the processor, a compressed representation of the input source code that preserves semantic meaning of the input source code, wherein the compression is based on the size of the target context window and also based on the determined semantic importance scores by: (i) selecting elements of the input source code for inclusion based on their semantic importance scores and based on the received size of the target context window, (ii) applying differentiated compression levels to the selected elements, wherein the selected elements are preserved with greater fidelity than elements with a lower semantic importance score, and (iii) embedding, for each element in the compressed representation, a source reference linking the element to a corresponding location in the input source code, thereby enabling the AI agent to expand a portion of the compressed representation associated with the embedded source reference, and wherein the AI agent receives additional content from the input source code corresponding to the expanded portion, and transmitting, by the processor, the compressed representation to the AI agent, wherein the compressed representation occupies no more than the target context window size.

In some embodiments, output of the AI agent is improved compared to output of the AI agent that receives not-compressed source code as input. In some embodiments, the compression comprises compressed representations that encode functional essence of blocks of the input source code. In some embodiments, the compression comprises bidirectional traceability between compressed representations and the input source code.

In some embodiments, the semantic model is generated by a semantic analyzer to augment the structural representation with semantic information. In some embodiments, a compression plan is generated to perform the compression based on the determined semantic importance scores and based on the size of the target context window. In some embodiments, the compression plan is executed to generate compressed representations.

In some embodiments, context patterns of the compressed data are mapped, and information from the compressed representation is retrieved while maintaining compression elsewhere. In some embodiments, the element type is selected from a group consisting of: interface declarations, class definitions, function signatures, implementation bodies, and auxiliary constructs. In some embodiments, elements classified as interface declarations or public API definitions are assigned higher importance than elements classified as implementation bodies or auxiliary constructs. In some embodiments, the compressed representation comprises natural language summaries of the input source code elements generated by the AI agent, and combined with preserved interface signatures, with each summary linked to the input source location.

There is thus provided, in accordance with some embodiments of the invention, a system for generation of a compressed representation of input source code for an artificial intelligence (AI) agent, the system including: a database, comprising the input source code, a processor, in communication with the database and configured to: receive the input source code and a size of a target context window associated with the AI agent, wherein the size of the target context window is based on a type of the AI agent, generate a semantic model of the input source code by: (i) parse the input source code according to a grammatical structure of the input source code's programming language to produce a parse tree, (ii) extract structural relationships between parsed elements of the parse tree; and (iii) extract functional relationships between parsed elements of the parse tree, classify each parsed element of the input source code based on element type of each parsed element as determined from the parse tree, and based on the position and connectivity within the semantic model, determine a semantic importance score for each parsed element based on element type classification and based on a degree of connectivity for each parsed element in the semantic model, wherein the degree of connectivity is based on the extracted structural relationships and the extracted functional relationships; generate a compressed representation of the input source code that preserves semantic meaning of the input source code, wherein the compression is based on the size of the target context window and also based on the determined semantic importance scores by: (i) select elements of the input source code for inclusion based on their semantic importance scores and based on the received size of the target context window, (ii) apply differentiated compression levels to the selected elements, wherein the selected elements are preserved with greater fidelity than elements with a lower semantic importance score; and (iii) embed, for each element in the compressed representation, a source reference linking the element to a corresponding location in the input source code, thereby enabling the AI agent to expand a portion of the compressed representation associated with the embedded source reference, and wherein the AI agent receives additional content from the input source code corresponding to the expanded portion, and transmit the compressed representation to the AI agent, wherein the compressed representation occupies no more than the size of the target context window.

In some embodiments, output of the AI agent is improved compared to output of the AI agent that receives not-compressed source code as input. In some embodiments, the compression comprises compressed representations that encode functional essence of blocks of the input source code. In some embodiments, the compression comprises bidirectional traceability between compressed representations and the input source code. In some embodiments, the semantic model is generated by a semantic analyzer to augment the structural representation with semantic information. In some embodiments, the processor is configured to generate a compression plan to perform the compression based on the determined semantic importance scores and based on the size of the target context window. In some embodiments, the element type is selected from a group consisting of: interface declarations, class definitions, function signatures, implementation bodies, and auxiliary constructs. In some embodiments, elements classified as interface declarations or public API definitions are assigned higher importance than elements classified as implementation bodies or auxiliary constructs.

There is thus provided, in accordance with some embodiments of the invention, a computer-implemented method of compressing input source code for processing by a large language model with a limited context window, including: receiving input source code and a target token budget from or for the large language model, parsing the input source code using the programming language's formal grammar to generate an Abstract Syntax Tree (AST), generating a semantic model by extracting from the AST both: (i) structural relationships including nesting hierarchies and declaration dependencies, and (ii) functional relationships including call chains, type references, and interface implementations, classifying each AST node into a semantic tier based on its element type, wherein interface declarations and exported function signatures are assigned to a highest tier, structural declarations to an intermediate tier, and implementation logic, boilerplate, and comments to progressively lower tiers, calculating an importance score for each AST node as a function of both its semantic tier and its connectivity degree in the semantic model, selecting AST nodes for retention by iteratively including nodes in descending importance order until the cumulative token count reaches the target token budget, for each retained node, including in the compressed output: the node's content at a fidelity level determined by its tier, its semantic type, and an AST node identifier linking back to the original source, for each excluded node, creating a reference record containing its AST node identifier and source location, enabling the large language model to request selective expansion, transmitting the compressed output with embedded reference records to the large language model, and upon receiving from the large language model a request to expand a specific region identified by AST node reference, retrieving the original source for that region, transmitting it, and adjusting the remaining token budget.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 5 shows an example for semantic importance scoring, according to some embodiments of the invention.

Figure 1:
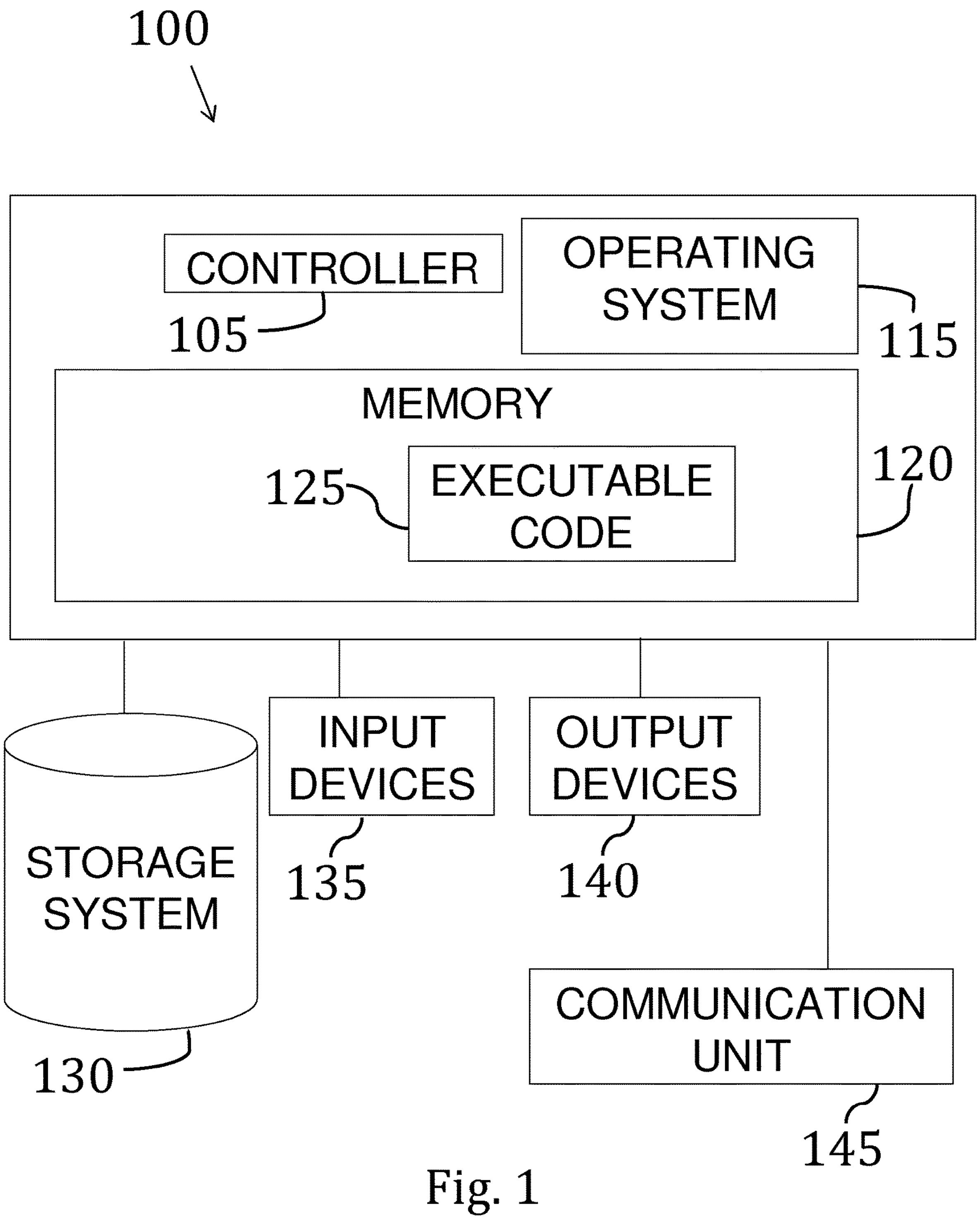
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, “processing”, “computing”, “calculating”, “determining”, “establishing”, “analyzing”, “checking”, or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms “plurality” and “a plurality” as used herein may include, for example, “multiple” or “two or more”. The terms “plurality” or “a plurality” may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device(s) 100, for example, to act as the various devices or the components shown in FIG. 2. For example, communication system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 are omitted. For example, memory 120 may be a non-volatile memory having the storage capacity of storage 130.

Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2:
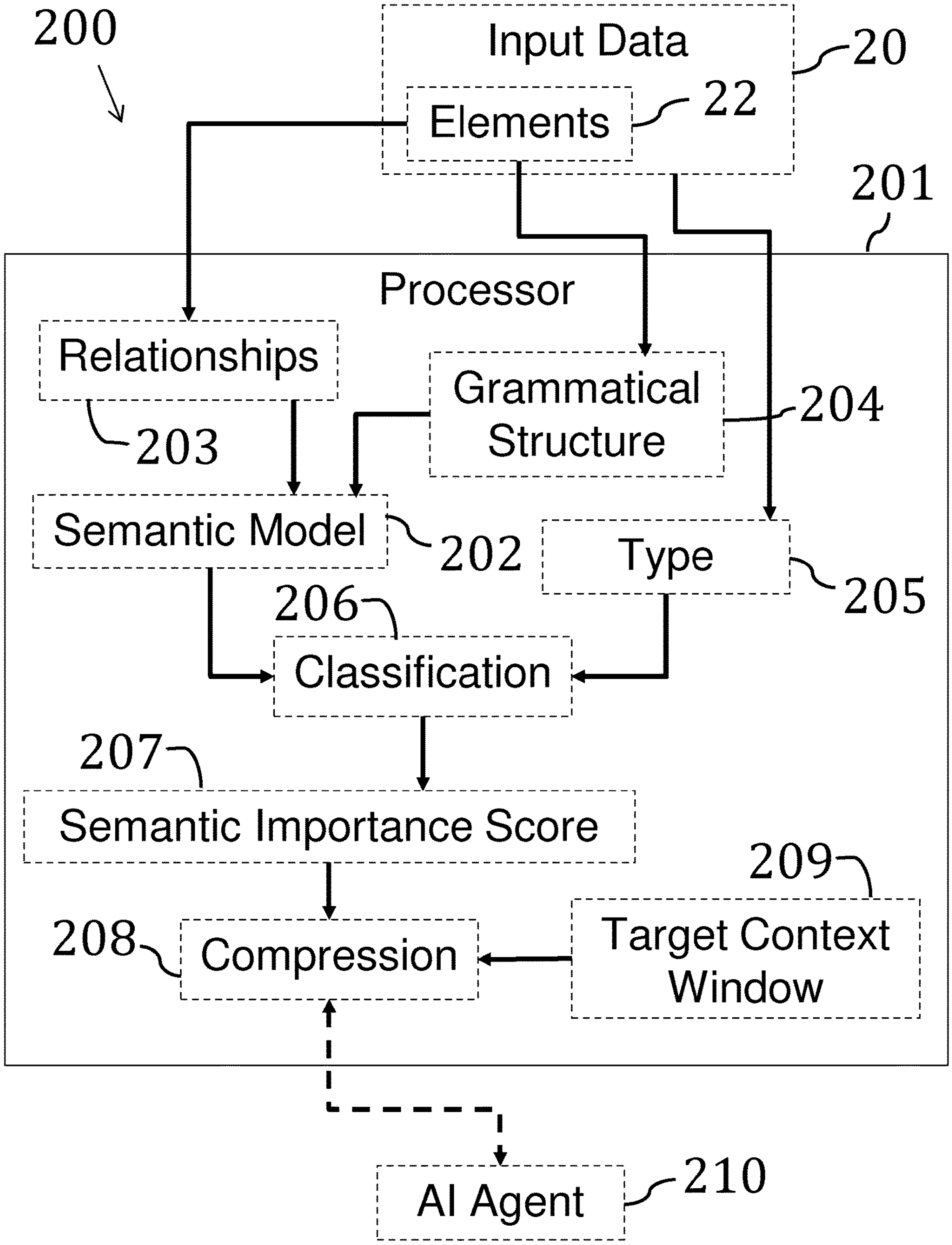
FIG. 2 shows a block diagram of a system for generation of a compressed representation of input data for the AI agent, according to some embodiments of the invention.

Reference is now made to FIG. 2, which shows a block diagram of a system 200 for generating a compressed representation of input data 20 for AI agent 210, according to some embodiments of the invention.

The system 200 may include a processor 201 (e.g., such as the controller 105, shown in FIG. 1), to generate a compressed representation of the input data 20 (e.g., source data). The input data 20 may be stored at a separate database (e.g., such as the storage system 130, shown in FIG. 1) and received by the processor 201 via wired or wireless communication.

The input data 20 may include various types of large textual datasets having a grammatical structure (e.g., code, configuration files, logs, and/or natural language with syntax constraints) intended for further processing by the AI agent 210. The AI agent 210 may be activated by the same processor 201 or alternatively the AI agent 210 may be activated by a different computing device. For example, a natural language with syntax constraints may include a legal document structure and/or a script for a movie. In some embodiments, the input data includes source code written in at least one programming language having a formal grammar or having correct syntax. For example, in JavaScript: function multiply(a, b) {return a*b;}

The processor 201 may generate a semantic model 202 of the input data 20. The semantic model 202 may be based on a grammatical structure 204 of the input data 20. In some embodiments, the semantic model 202 includes structural and/or functional relationships 203 between different elements 22 of the input data 20. For example, the semantic model 202 may map all elements 22 in the input data 20 based on semantic context, the relationship between these elements and/or the grammatical structure 204.

In some embodiments, the compressed representation includes multiple abstraction layers including at least one of: symbolic interface definitions, behavioral invariants, and/or representative execution traces, with source references enabling drill-down to original implementations. In some embodiments, the compressed representation includes natural language summaries of source code elements generated by a language model, combined with preserved interface signatures, with each summary linked to its input source location. In some embodiments, the compressed representation includes structured reference records with element identifiers, type annotations, and/or source locations, for instance with full element content provided on-demand in response to agent requests.

A framework recognizer may identify framework-specific patterns and/or idioms (e.g., react components, express middleware, and/or Django views) that carry semantic meaning beyond their syntactic structure thereby allowing framework-aware compression.

According to some embodiments, the semantic model 202 may be generated by a structural analysis engine including a syntax parser, a semantic analyzer and/or a framework recognizer. The syntax parser may transform the input data (e.g., source code) text into structured representations capturing the grammatical structure of the data. In some embodiments, the structural analysis engine generates the semantic model 202 by at least one of: abstract syntax tree (AST), concrete syntax trees, and/or semantic graphs.

The semantic analyzer can augment the structural representation with semantic information including: type information and inference results; scope and binding relationships; control flow and data flow patterns; cross-reference and dependency mappings and/or framework recognizer.

In some embodiments, the semantic model is generated using learned neural embeddings of source code elements, and the structural and/or functional relationships may be derived from embedding vector proximity and/or from analysis of attention-weight.

The processor 201 may analyze the input data 20 to extract and/or preserve semantic structure based on the functional relationships 203, data flows, dependencies, and/or hierarchical organization that define how this data operates.

According to some embodiments, the processor 201 classifies the elements 22 of the input data 20, with the resulting classification 206 being based on a type 205 of each element and based on the generated semantic model 202.

The type 205 may include at least one of: function declarations, class definitions, type definitions or interfaces, variable declarations, import or export statements, method signatures, conditional logic blocks, loop constructs, callback or event handler definitions, configuration objects, comment blocks, styling and/or formatting constructs.

For example, in a TypeScript codebase, the type may be determined by an export function calculateTotal(items: Item[ ]): number.

In some embodiments, element may be assigned a type of "exported function signature," while a block of Tailwind CSS such as className="flex items-center justify-between p-4 bg-white rounded-lg shadow-md" may be assigned a type of "styling construct," and a line such as // TODO: refactor this may be assigned a type of "inline comment." The determined type, together with the semantic model, may then inform the classification and the resulting semantic importance score.

According to some embodiments, the processor 201 determines a semantic importance score 207 for each element 22 of the input data 20, based on the classification 206. For example, the processor 201 may classify elements 22 according to their syntax importance for understanding behavior for further processing with the AI agent 210. Elements 22 that are critical to comprehension (e.g., interfaces, top level declarations, type definitions) may be distinguished from other elements that provide implementation detail (e.g., algorithm bodies, styling, boilerplate).

In some embodiments, a language model in a unified inference may classify and/or determine importance scores and/or generate compressed representations by passing the captured element types and semantic relationships.

In some embodiments, the semantic importance score is determined based on a combination of structural properties derived from the semantic model and statistical information-theoretic properties including at least one of: a rate-distortion cost representing semantic fidelity loss caused by compressing this element at a given bit rate and/or mutual information.

In some embodiments, a semantic importance score is a numerical value derived from both the element's type classification tier and its degree of connectivity in the semantic model, with elements classified as interface declarations or public API definitions may be assigned higher importance scores than elements classified as implementation bodies or auxiliary constructs.

In some embodiments, the semantic importance value may be attributed by alternative methods to scoring such as, based on the created semantic structure a model resulting in a conclusion if it should or should not compact the structure body (e.g., may be based on scoring, labelling, and/or segmentation).

The semantic importance score 207 for each element 22, may represent the importance of that element in the context of the entire input data 20, such that after the classification 206 is carried out, the processor 201 may determine whether to preserve verbatim each element 22. For example, elements with a low semantic importance score 207 (e.g., lower than 50) may be further processes for compression. For example, the scoring system may include each syntax element having 'x' points according to its abstract syntax tree (AST) element (or node) type, with each line accumulating total score based on total elements.

The semantic importance score 207 may be determined by the processor 201 with an importance classification engine implementing a hierarchical classification that distinguishes: interface elements, structural elements, behavioral elements and/or auxiliary elements. The interface elements may be used for understanding system capabilities and are typically preserved with high fidelity, and include public APIs, exported functions, type definitions, and contracts that define how code interacts with external users. The structural elements may be compressed to semantic summaries that capture their functional effect that communicate system structure, and/or can include declarations, class definitions, and/or organizational constructs that establish the architecture of the codebase. The behavioral elements may implement logic, algorithms, and business rules that define what the input data does. The auxiliary elements may be candidates for aggressive compression or omission, where these elements can include comments, formatting, styling, boilerplate, and/or repetitive constructs that can provide limited semantic value.

In some embodiments, the semantic importance score is based at least in part on graph centrality metrics including at least one of PageRank, betweenness centrality, or eigenvector centrality applied to the semantic model. In some embodiments, the semantic importance score is determined at a sub-element granularity including token-level and/or line-level scoring, using attention-weight analysis from a pre-trained code model. In some embodiments, the semantic importance score is determined using causal analysis, where an element may be scored based on the degree to which its removal may alter the functional behavior of dependent elements in the semantic model.

For ranking, the classified elements may be ranked with a tier ranking system, ranging from highest importance (e.g., for interface/exports) to lowest (e.g., for boilerplate language/styles). For example, in a tier system, tier 1 may be for interface/contract elements (having highest Importance) including exported function and/or class signatures, public API definitions, type definitions and/or interfaces, module exports and/or entry points such that elements may be preserved verbatim or with minimal compression. Tier 2 may be for state and/or data flow elements, including state declarations and initializations, props and/or parameter definitions, data transformation pipelines, store and/or context definitions, such that signatures may be preserved. Tier 3 may be for structural and/or organizational elements, including function and method declarations, class and module organization, component composition structure, routing and/or navigation definitions, such that declarations may be preserved, and/or bodies compressed to semantic summaries. Tier 4 may be for implementation logic elements, including algorithm implementations, business logic bodies, event handlers and/or callbacks, data processing functions, such that these elements may be compressed to behavioral summaries with expansion capability. Tier 5 may be for boilerplate/static elements, including static data, boilerplate and/or scaffolding; verbose configuration, and/or repetitive patterns, such that these elements may be aggressively compressed or summarized by count/category. Tier 6 may be for comments (or lowest preserved importance), including code comments (inline, block, documentation) such that these elements may be aggressively compressed, summarized, or omitted. Some elements may also be ignored, for instance non-semantic elements, including spacing, newlines, indentation, and/or styling/CSS-in-JS.

In some embodiments, compression 208 of the input data 20 is also based on a parameter for predefined size of a target context window 209. For example, configurable compression levels may be determined that adapt to specified budgets (e.g., received separately by the processor). A semantic compression engine (e.g., executed by the processor 201) may execute the compression plan to generate compressed representations, by extracting the essential interface of data elements (e.g., including function signatures, parameter types, and/or return types) that define what each element may accept and/or produce. The semantic compression engine may also analyze implementation bodies to generate semantic summaries capturing input-output relationships, side effects and/or mutations, dependencies invoked, structural outputs (e.g., UI components rendered), and/or algorithmic characteristics. The semantic compression engine may also produce compressed representations in a format suitable for input for AI agents, and/or may annotate compressed representations with source references (e.g., file paths, line numbers, AST node identifiers) thereby enabling selective expansion.

The processor 201 may automatically determine appropriate compression aggressiveness to meet target context window 209 sizes while maximizing the preserved semantic content or data. For example, the elements 22 may be assigned to categories such as: verbatim preservation (e.g., without compression), signature preservation (e.g., with the interface preserved, body compressed), with the summary representation (e.g., a semantic summary only), with the reference only (e.g., pointer to source location), and/or with the direct omission (e.g., excluded from output).

In some embodiments, the processor 201 may distribute the available tokens, corresponding to the target context window 209, across code elements based on importance scores, thereby ensuring that high-importance elements receive sufficient allocation for faithful representation. In some embodiments, the processor 201 may employ optimization techniques to find compression configurations that maximize semantic value within resource constraints (e.g., corresponding to the target context window 209). The compression may be optimized using an information-theoretic objective function that maximizes mutual information between the compressed representation and a specified downstream task.

According to some embodiments, the processor 201 performs a compression 208 of at least one element 22 of the input data 20 that may preserve semantic meaning of the input data 20 (while discarding syntactic detail), with the compression 208 being based on the determined semantic importance scores 207.

The compression 208 may result in information reduction of the input data 20, that maintains functional understanding. The compressed representations may serve as a semantic summary that communicates what the input data does without details on how it does it. In some embodiments, the compression 208 may be a semantic compression that results in a compressed, navigable representation suitable for input to the AI agent 210.

In some embodiments, the system 200 maintains bidirectional traceability between the compressed representations and the input source as the input data, enabling selective expansion. For example, the AI agent may decompress regions to access additional details when needed, thereby creating an interactive and/or hierarchical exploration capability. A selective expansion engine may interpret AI agent requests for expansion (e.g., reference line numbers, function names, file regions, or navigation markers), and/or retrieve input source for requested regions and determines appropriate representation detail level, and/or integrate expanded content with existing compressed context, so as to manage the overall token budget. The source references may be embedded within the compressed representation itself, including abstract syntax tree (AST) node identifiers, file paths, and line numbers, such that the AI agent may reference specific regions of the compressed output and request selective expansion without requiring access to an external mapping table. In some embodiments, the AI agent may expand a portion of the compressed representation associated with the embedded source reference, and the AI agent may accordingly receive additional content from the input source code corresponding to the expanded portion.

An output assembly engine may combine the compressed representations into a coherent output suitable for AI agents. In some embodiments, the processor 201 transmits the compressed input data to the AI agent 210. The output assembly engine may maintain the organizational structure of the original data (e.g., file boundaries, module organization) in the compressed output, inserts markers, anchors, or placeholders that enable the AI agent to request expansion of specific regions, and/or ensure the output remains syntactically valid or clearly delineated.

Figure 3A:
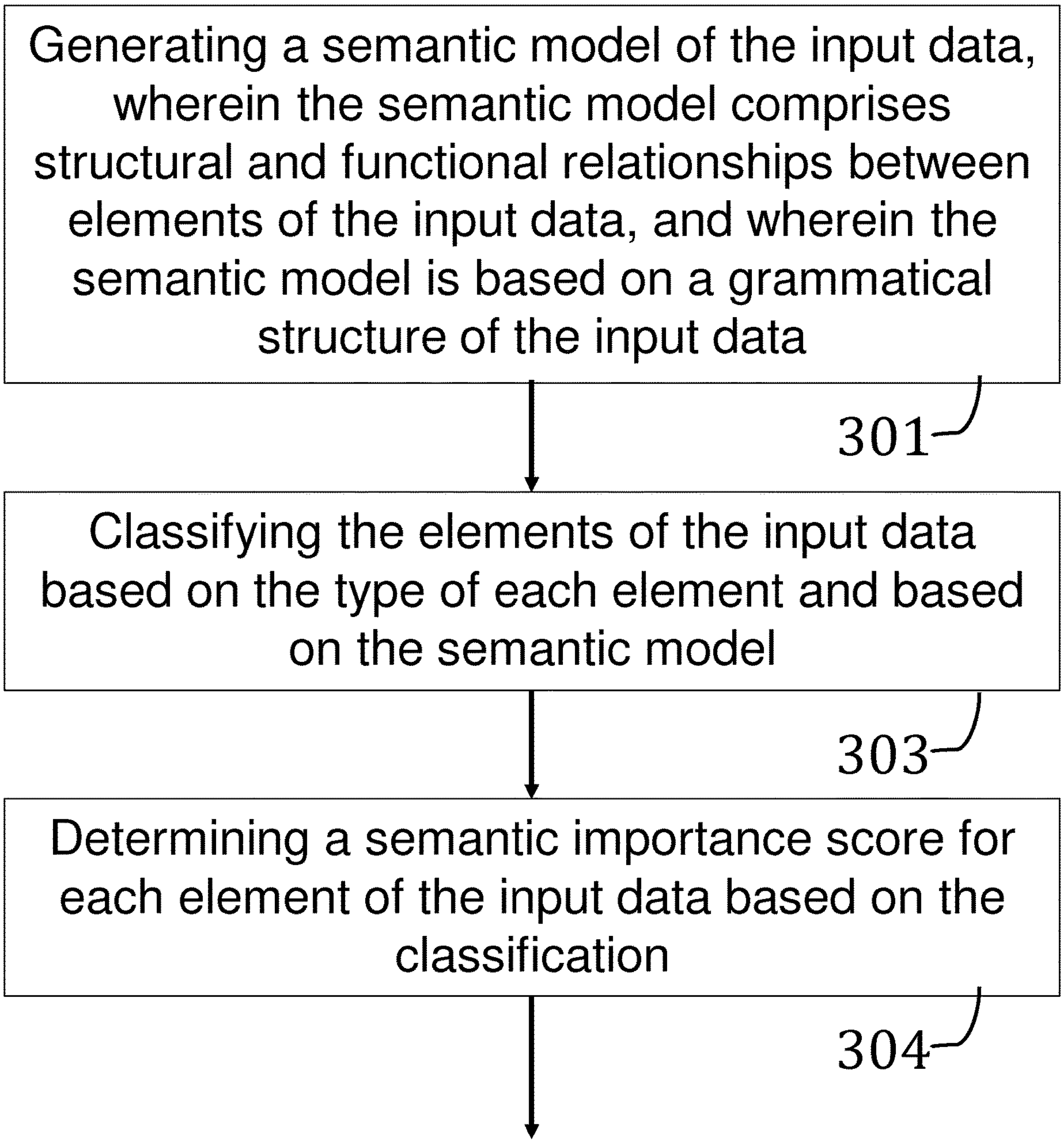
FIGS. 3A-3B show a flowchart of a method of generating a compressed representation of input data for the AI agent, according to some embodiments of the invention.
Figure 3B:
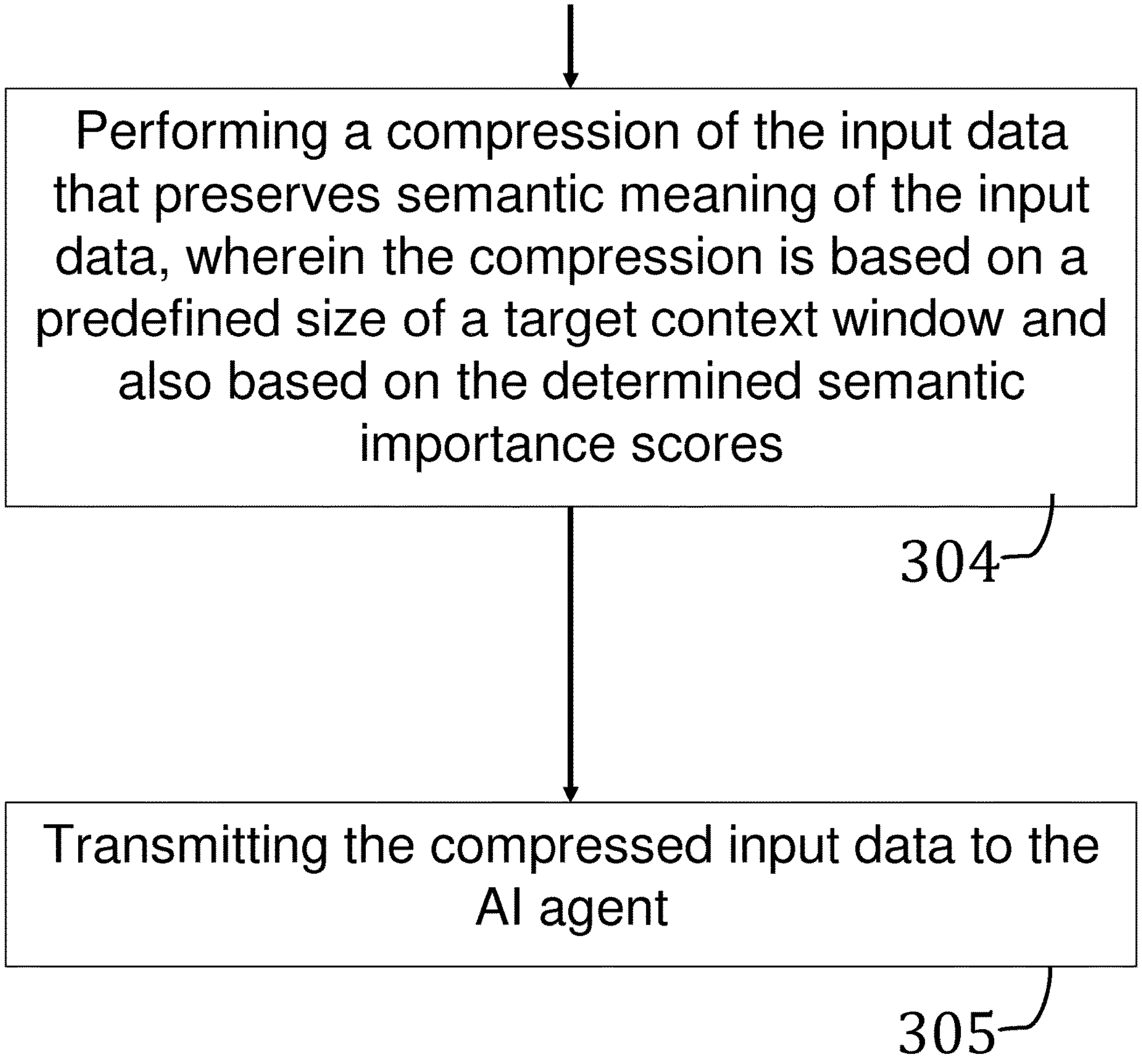

Reference is now made to FIGS. 3A-3B, which show a flowchart for a method of generating a compressed representation of input data for the AI agent, according to some embodiments of the invention.

The processor 201 may generate 301 a semantic model of the input data, where the semantic model includes structural and/or functional relationships between elements of the input data, and wherein the semantic model is based on a grammatical structure of the input data. The processor 201 may classify 302 the elements 22 of the input data 20 based on the type of each element and/or based on the semantic model 202. The processor 201 may determine 303 a semantic importance score for each element of the input data based on the classification. The processor 201 may perform 304 a compression of the input data that preserves semantic meaning of the input data, wherein the compression is based on a parameter for predefined size of a target context window and also based on the determined semantic importance scores. The processor 201 may transmit 305 the compressed input data to the AI agent.

According to some embodiments, classification is carried out into a multi-tier hierarchy based on element type and/or connectivity.

According to some embodiments, the semantic model includes structural relationships (e.g., nesting and declaration dependencies) and/or functional relationships (e.g., call chains, type references and/or dependency linkages), with a unified model that maps all elements based on semantic context and relationships. The unified model may be generated in a single analytical step. Thus, the source code is received as input, and a compressed document comes out being optimized (e.g., for a specific token budget), with built-in navigation for analysis and review.

The semantic model may be generated by parsing the input source code, for instance according to a grammatical structure of the input source code's programming language to produce a parse tree. The semantic model may be generated by extracting structural relationships between parsed elements of the parse tree, based on nesting hierarchies (organizing elements into layered, successively inclusive structures) and/or declaration dependencies (creating relationships requiring specific ordering) in the parse tree.

The semantic model may also be generated by extracting functional relationships between parsed elements of the parse tree, based on at least one of: call chains, type references, and dependency linkages. Call chains may include linking multiple, sequential interactions with LLMs to accomplish complex tasks, by feeding the output of one step as input into the next. The type references in the input source code may be used to identify, define, and/or link data types, schemas, and/or object structures.

In some embodiments, output of the AI agent is improved compared to output of the AI agent that receives not-compressed input data as input. By comparing the compressed output to non-compressed data of similar length, the output of the AI agent is improved as it requires less resources to process.

For example, experimental results demonstrate for original input data of a software codebase of 816,704 characters: medium compression (at 50% target) achieved 399,290 characters (with 48.9% of original), maximum compression (at 15% target) achieved 86,041 characters (at 10.5% of original), representing an 89.5% reduction while maintaining navigability and semantic fidelity.

Figure 4A:
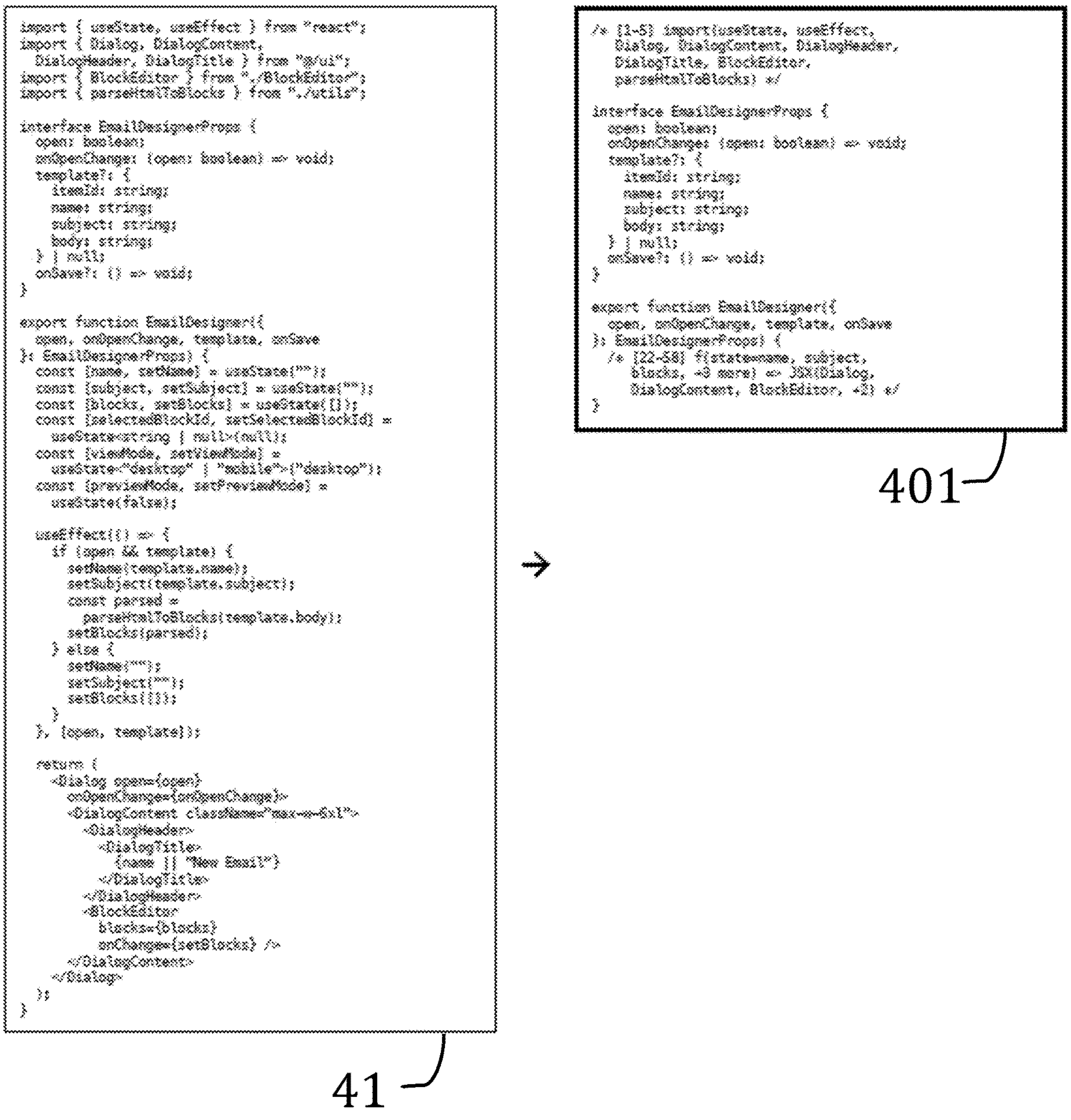
FIGS. 4A-4C show examples of compressed representation reduction, according to some embodiments of the invention.
Figure 4B:
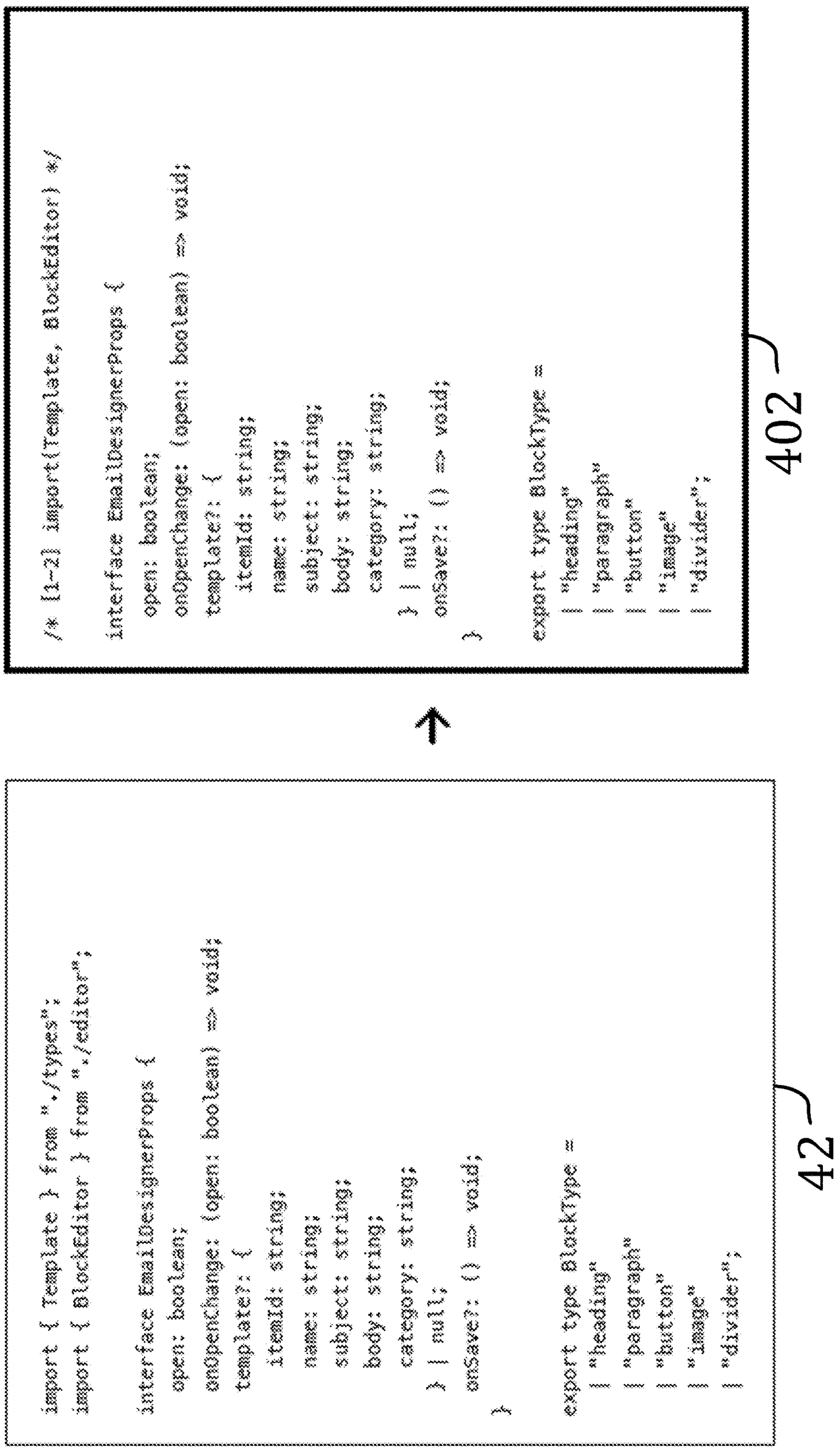
Figure 4C:
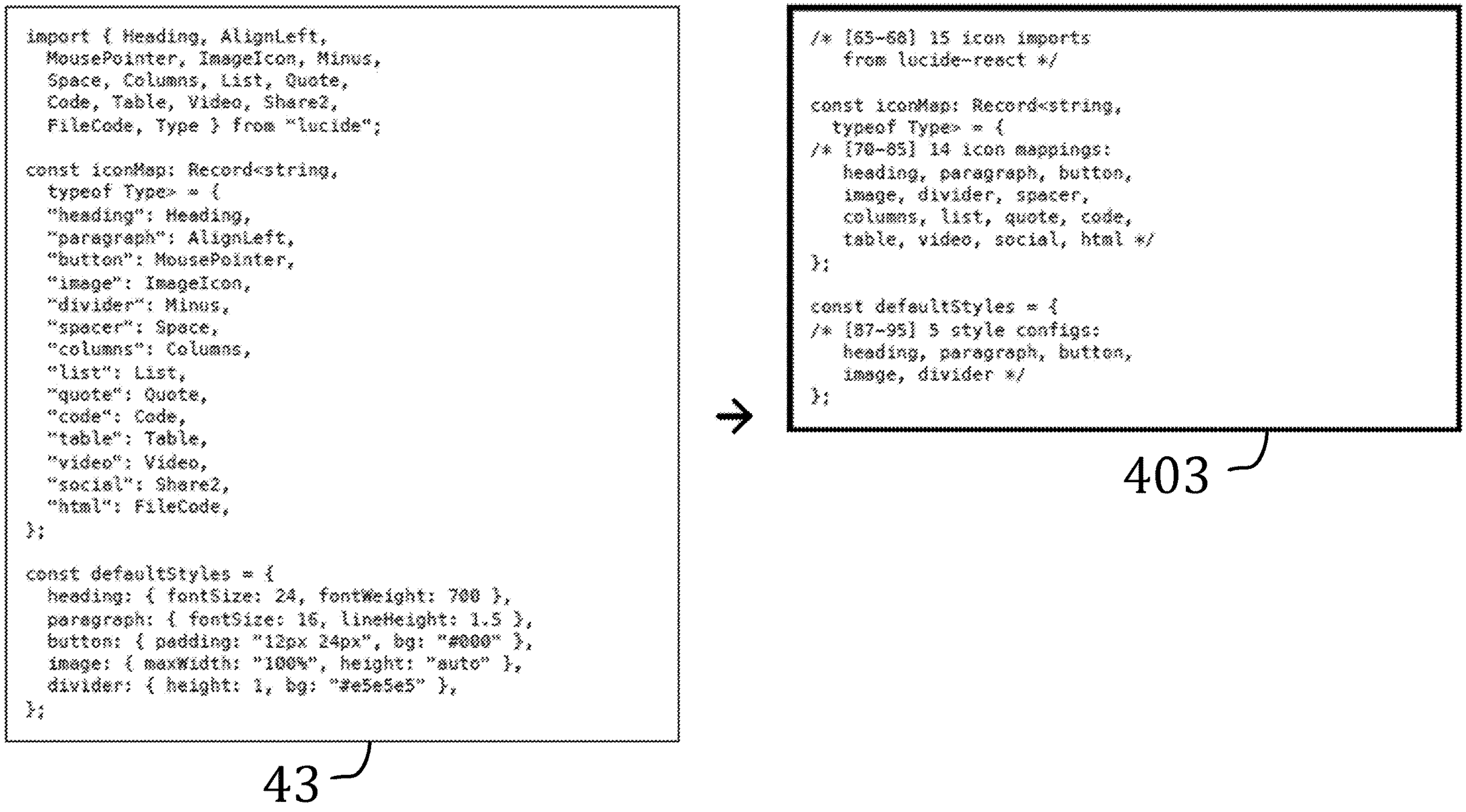

Reference is now made to FIGS. 4A-4C, which show examples of compressed representation reduction, according to some embodiments of the invention.

FIG. 4A shows a function body compression, with semantic compression of implementation details, including 58 lines in the original input 41 and less than half for the compressed output 401.

FIG. 4B shows interface preservation compression, with Tier1 elements preserved verbatim. The original input 42 is compressed to output 402 such that the interfaces are unchanged.

FIG. 4C shows static data compression, with Tier5 elements aggressively compressed. The original input 43 including about thirty lines is compressed to output 403.

Reference is now made to FIG. 5, which shows an example for semantic importance scoring, according to some embodiments of the invention. An importance score is determined per each line of the input and accordingly determines the corresponding compression.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of generating a compressed representation of source code for an artificial intelligence (AI) agent, the method comprising:

receiving, by a processor, input source code and a size of a target context window associated with the AI agent, wherein the size of the target context window is based on a type of the AI agent;

generating, by the processor, a semantic model of the input source code by:

(i) parsing the input source code to generate parsed elements of the input source code according to a grammatical structure of a programming language of the input source code to produce a parse tree;

(ii) extracting structural relationships between parsed elements of the parse tree; and (iii) extracting functional relationships between the parsed elements of the parse tree;

wherein the semantic model comprises the parsed elements of the input source code, the extracted structural relationships, and the extracted functional relationships;

classifying, by the processor, each parsed element of the input source code based on an element type of each parsed element of the input source code as determined from the parse tree, and based on a position and a connectivity of each parsed element of the input source code within the semantic model, to generate a corresponding element type classification for each parsed element of the input source code;

determining, by the processor, a semantic importance score for each parsed element of the input source code based on the corresponding element type classification and based on a degree of connectivity for each parsed element of the input source code in the semantic model, wherein the degree of connectivity is based on the extracted structural relationships and the extracted functional relationships;

generating, by the processor, a compressed representation of the input source code that preserves semantic meaning of the input source code, wherein the compressed representation is based on the size of the target context window and also based on the determined semantic importance scores by:

(i) selecting elements of the input source code for inclusion in the compressed representation based on the determined semantic importance scores and based on the received size of the target context window;

(ii) applying differentiated compression levels to the selected elements, wherein the selected elements are preserved with greater fidelity than elements with a lower semantic importance score; and (iii) embedding, for each selected element in the compressed representation, a source reference linking the selected element to a corresponding location in the input source code;

requesting, by the AI agent, expansion of a portion of the compressed representation associated with one or more of the embedded source references, and in response to the request, receiving by the AI agent additional content from the input source code corresponding to the one or more of the embedded source references, and integrating the additional content into the compressed representation to generate an integrated compressed representation;

transmitting, by the processor, the integrated compressed representation to the AI agent, wherein the integrated compressed representation occupies no more than the size of the target context window; and providing output by the AI agent based on the integrated compressed representation.

2. The method of claim 1, wherein the output provided by the AI agent is improved compared to an output of the AI agent that receives not-compressed source code as input.

3. The method of claim 1, wherein the compressed representation encodes functional essence of blocks of the input source code.

4. The method of claim 1, wherein the compressed representation comprises bidirectional traceability between portions of the compressed representation and the input source code.

5. The method of claim 1, wherein the semantic model is generated by a semantic analyzer to augment a structural representation with semantic information.

6. The method of claim 1, further comprising generating a compression plan to perform generation of the compressed representation based on the determined semantic importance scores and based on the size of the target context window.

7. The method of claim 6, wherein the compression plan is executed to generate compressed representations.

8. The method of claim 7, further comprising:

mapping context patterns of compressed data; and retrieving information from the compressed representation while maintaining compression elsewhere.

9. The method of claim 1, wherein the element type is selected from the group consisting of: interface declarations, class definitions, function signatures, implementation bodies, and auxiliary constructs.

10. The method of claim 1, wherein elements classified as interface declarations or public Application Programming Interface (API) definitions are assigned higher importance than elements classified as implementation bodies or auxiliary constructs.

11. The method of claim 1, wherein the compressed representation comprises natural language summaries of the input source code generated by the AI agent, combined with preserved interface signatures, with each summary linked to an input source location.

12. A system for generation of a compressed representation of input source code for an artificial intelligence (AI) agent, the system comprising:

a database, comprising the input source code; and a processor, in communication with the database and configured to:

receive the input source code and a size of a target context window associated with the AI agent, wherein the size of the target context window is based on a type of the AI agent;

generate a semantic model of the input source code by:

(i) parse the input source code to generate parsed elements of the source code according to a grammatical structure of a programming language of the input source code to produce a parse tree;

(ii) extract structural relationships between parsed elements of the parse tree; and (iii) extract functional relationships between the parsed elements of the parse tree;

wherein the semantic model comprises the parsed elements of the input source code, the extracted structural relationships, and the extracted functional relationships;

classify each parsed element of the input source code based on an element type of each parsed element of the input source code as determined from the parse tree, and based on a position and a connectivity of each parsed element of the input source code within the semantic model, to generate a corresponding element type classification for each parsed element of the input source code;

determine a semantic importance score for each parsed element of the input source code based on the corresponding element type classification and based on a degree of connectivity for each parsed element of the input source code in the semantic model, wherein the degree of connectivity is based on the extracted structural relationships and the extracted functional relationships;

generate a compressed representation of the input source code that preserves semantic meaning of the input source code, wherein the compressed representation is based on the size of the target context window and also based on the determined semantic importance scores by:

(i) select elements of the input source code for inclusion in the compressed representation based on the determined semantic importance scores and based on the received size of the target context window;

(ii) apply differentiated compression levels to the selected elements, wherein the selected elements are preserved with greater fidelity than elements with a lower semantic importance score; and (iii) embed, for each selected element in the compressed representation, a source reference linking the selected element to a corresponding location in the input source code;

request, by the AI agent, expansion of a portion of the compressed representation associated with one or more of the embedded source references, and in response to the request, receive by the AI agent additional content from the input source code corresponding to the one or more of the embedded source references, and integrate the additional content into the compressed representation to generate an integrated compressed representation transmit the integrated compressed representation to the AI agent, wherein the integrated compressed representation occupies no more than the size of the target context window; and provide output by the AI agent based on the integrated compressed representation.

13. The system of claim 12, wherein the output provided by the AI agent is improved compared to an output of the AI agent that receives not-compressed source code as input.

14. The system of claim 12, wherein the compressed representation encodes functional essence of blocks of the input source code.

15. The system of claim 12, wherein the compressed representation comprises bidirectional traceability between portions of the compressed representation and the input source code.

16. The system of claim 12, wherein the semantic model is generated by a semantic analyzer to augment a structural representation with semantic information.

17. The system of claim 12, wherein the processor is configured to generate a compression plan to perform generation of the compressed representation based on the determined semantic importance scores and based on the size of the target context window.

18. The system of claim 12, wherein the element type is selected from the group consisting of: interface declarations, class definitions, function signatures, implementation bodies, and auxiliary constructs.

19. The system of claim 12, wherein elements classified as interface declarations or public Application Programming Interface (API) definitions are assigned higher importance than elements classified as implementation bodies or auxiliary constructs.

* * * * *